(12) United States Patent
He (10) Patent No.: US 10,913,452 B2
(45) Date of Patent: Feb. 9, 2021

(54) METHOD AND A VEHICLE CONTROL SYSTEM FOR CONTROLLING AN AUTONOMOUS VEHICLE

(71) Applicant: VALEO INTERIOR CONTROLS (SHENZHEN) CO., LTD, Shenzhen (CN)

(72) Inventor: Chuan He, Shenzhen (CN)

(73) Assignee: VALEO INTERIOR CONTROLS (SHENZHEN) CO., LTD, Shenzhen (CN)

( * ) Notice: Subject to any disclaimer, the term of this patent is extended or adjusted under 35 U.S.C. 154(b) by 348 days.

(21) Appl. No.: 15/977,627

(22) Filed: May 11, 2018

(65) Prior Publication Data

US 2018/0326980 A1   Nov. 15, 2018

(30) Foreign Application Priority Data

May 12, 2017   (CN) .......................... 2017 1 0340770

(51) Int. Cl.
*B60W 30/09*      (2012.01)
*B60W 30/095*     (2012.01)
(Continued)

(52) U.S. Cl.
CPC .............. *B60W 30/09* (2013.01); *B60T 7/22* (2013.01); *B60W 30/095* (2013.01);
(Continued)

(58) Field of Classification Search
CPC ............... B60T 7/22; B60T 2201/022; B60W 50/0098; B60W 40/09; B60W 30/0956; B60W 30/095; B60W 30/09
See application file for complete search history.

(56) References Cited

U.S. PATENT DOCUMENTS

| 5,959,572 A * | 9/1999 | Higashimata .......... G08G 1/166 |
| | | 342/70 |
| 6,259,992 B1 * | 7/2001 | Urai ................... B60K 31/0008 |
| | | 701/301 |

(Continued)

FOREIGN PATENT DOCUMENTS

| CN | 103935364 A | 7/2014 |
| CN | 106133805 A | 11/2016 |

(Continued)

OTHER PUBLICATIONS

The European Search Report issued in corresponding European Application No. 18172070.7-1012, dated Sep. 21, 2018 (5 pages).

(Continued)

*Primary Examiner* — Nicholas Kiswanto
(74) *Attorney, Agent, or Firm* — Osha Bergman Watanabe & Burton LLP (57) ABSTRACT

The present disclosure provides a method and a vehicle control system for controlling an autonomous vehicle. The method comprises utilizing the sensor group of said vehicle to acquire data related to said vehicle, wherein said data includes the speed of said vehicle, the speed of another object ahead of said vehicle, and the distance between said vehicle and another object, determining the crash probability between said vehicle and another object according to the data related to said vehicle, calculating the total magnitude of value according to said crash probability on the basis of the prospect theory, wherein said total magnitude of value indicates the balance between the value of crash risk reduction and the value of user comfort loss, and calculating the brake force according to said total magnitude of value.

24 Claims, 5 Drawing Sheets

(51) Int. Cl.
*B60T 7/22* (2006.01)
*B60W 40/09* (2012.01)
*B60W 50/00* (2006.01)

(52) U.S. Cl.
CPC ........ *B60W 30/0956* (2013.01); *B60W 40/09* (2013.01); *B60W 50/0098* (2013.01); *B60T 2201/022* (2013.01)

(56) References Cited

U.S. PATENT DOCUMENTS

| | | | | |
|---|---|---|---|---|
| 6,851,504 | B2* | 2/2005 | Campbell | B60R 21/013 180/271 |
| 7,124,027 | B1* | 10/2006 | Ernst, Jr. | G01S 13/931 701/301 |
| 8,200,419 | B2* | 6/2012 | Shimizu | B60T 7/22 701/301 |
| 9,409,574 | B2* | 8/2016 | Gokan | B60W 10/04 |
| 9,566,981 | B2* | 2/2017 | Rebhan | B60W 30/0956 |
| 10,053,065 | B2* | 8/2018 | Ignaczak | B60T 8/32 |
| 10,460,394 | B2* | 10/2019 | Perl | G06Q 50/30 |
| 2006/0195231 | A1* | 8/2006 | Diebold | B60T 7/22 701/1 |
| 2018/0032891 | A1* | 2/2018 | Ba | B60W 30/095 |

FOREIGN PATENT DOCUMENTS

| | | |
|---|---|---|
| DE | 102010021872 A1 | 12/2011 |
| DE | 102011100277 A1 | 11/2012 |
| DE | 102011055685 A1 | 5/2013 |
| DE | 102012218842 A1 | 4/2014 |
| EP | 2407356 A1 | 1/2012 |
| WO | 2004 085220 A1 | 10/2004 |

OTHER PUBLICATIONS

First Office Action in corresponding Chinese Application No. 2017103407704, dated Aug. 27, 2019 (7 pages).
D. Kahneman and A. Tversky, "Prospect Theory: An Analysis of Decision Under Risk," Econometrica, vol. 47, No. 2, pp. 263-291, Mar. 1979 (29 pages).

* cited by examiner

METHOD AND A VEHICLE CONTROL SYSTEM FOR CONTROLLING AN AUTONOMOUS VEHICLE

TECHNICAL FIELD

The present invention relates to the automobile control technology, and in particular relates to a method and a vehicle control system for controlling an autonomous vehicle.

BACKGROUND ART

The autonomous driving technology is a research hotspot in the current automobile design field. In the control policies for autonomous driving, it is necessary to detect the environment surrounding a vehicle, intervene in the detected risks, and take a braking action to reduce the speed. However, only crash risk reduction, instead of the influence of the brake force on the comfort of the passengers in the vehicle is considered in the current control policies. For example, DE 10 2011 100 277 A1 discloses a method for automatically adjusting the preset parameters of a driver assistance system. The parameters of the assistance system match the driving behaviour of a driver. Therefore, the parameters used to control the braking behaviour of the assistance system can be adjusted so that the braking behaviour of the assistance system is similar to the braking behaviour of the driver.

However, this solution cannot balance the relationship between crash risk avoidance and comfort loss. For example, a crash risk cannot be avoided if there is no braking or the brake force is too small. However, too large a brake force or too frequent braking operations will cause the passengers to feel overreaction of the vehicle or frighten the passengers. This will reduce of the ride comfort of the passengers.

SUMMARY OF THE INVENTION

In view of the above-mentioned problems, the present invention proposes a method and a vehicle control system for controlling an autonomous vehicle so as to balance the relationship between the vehicle crash risk avoidance and the comfort loss, simulate the driving mode of a human driver to the greatest extent to control the vehicle, and improve the intelligence level of control policies.

According to one aspect of the present invention, a method for controlling an autonomous vehicle is provided. The method comprises utilizing the sensor group of said vehicle to acquire data related to said vehicle, wherein said data includes the speed of said vehicle, the speed of another object ahead of said vehicle, and the distance between said vehicle and another object, determining the crash probability between said vehicle and another object according to the data related to said vehicle, calculating the total magnitude of value according to said crash probability on the basis of the prospect theory, wherein said total magnitude of value indicates the balance between the value of crash risk reduction and the value of user comfort loss, and calculating the brake force according to said total magnitude of value.

According to another aspect of the present invention, a vehicle control system for controlling an autonomous vehicle is provided. The vehicle control system comprises a storage, which stores computer program instructions, and a processor, which is configured to run the computer program instructions stored in said storage in order to utilize the sensor group of said vehicle to acquire data related to said vehicle, wherein said data includes the speed of said vehicle, the speed of another object ahead of said vehicle, and the distance between said vehicle and another object, determine the crash probability between said vehicle and another object according to the data related to said vehicle, calculate the total magnitude of value according to said crash probability on the basis of the prospect theory, wherein said total magnitude of value indicates the balance between the value of crash risk reduction and the value of user comfort loss, and calculate the brake force according to said total magnitude of value.

By using the solution in the present invention, not only the crash risk of an autonomous vehicle can be avoided, but also comfort reduction can be avoided, and thus a balance between the two is achieved.

BRIEF DESCRIPTION OF THE DRAWINGS

After a detailed description of the present invention by reference to the following drawings, the present invention will be better understood and the other objectives, details, characteristics, and advantages of the present invention will become more obvious. In the drawings.

DETAILED DESCRIPTION OF THE INVENTION

The following will describe in detail the preferred embodiments of the present invention by reference to the drawings. Although the preferred embodiments of the present invention are shown in the drawings, it should be understood that the present invention can be realized in various forms and should not be restricted by embodiments described here. On the contrary, these embodiments are provided to make the present invention more thoroughly and completely understood and completely deliver the scope of the present invention to those skilled in the art.

In the solution of the present disclosure, the prospect theory (access the website at https://en.wikipedia.org/wiki/Prospect_theory) is used. The prospect theory was founded by Daniel Kahneman and Amos Tversky in 1979 and is psychologically used to more precisely describe decision making (see Kahneman, Daniel; Tversky, Amos (1979). "Prospect Theory: An Analysis of Decision under Risk". Econometrica 47 (2): 263. doi:10.2307/1914185. ISSN 0012-9682). The fundamental of the prospect theory is shown by formula (1) below:

$$U = \sum_{i=1}^{n} w(p_i)v(x_i), \tag{1}$$

wherein U is the total utility or expected utility, $x_1$, $x_2, \ldots, x_n$ are possible results, $p_1, p_2, \ldots, p_n$ are the corresponding probability of each result, respectively, and v is a value function. The value function v reflects that human beings are risk averse when making a profit-related decision, and are risk loving when making a loss-related decision.

The theory describes how individuals evaluate profits and losses and that the loss weight is higher than the profit weight. Therefore, people prefer to risk avoiding losses, instead of risking gaining rewards.

The traditional prospect theory is converted in the solution of the present disclosure, and a relationship between the value of crash risk avoidance (profit) and the value of user comfort loss (loss) is established to achieve a balance between the two. The detailed description of the embodiments of the present disclosure in combination with FIG. 1 to FIG. 5 will make this idea clearer.

Figure 1:
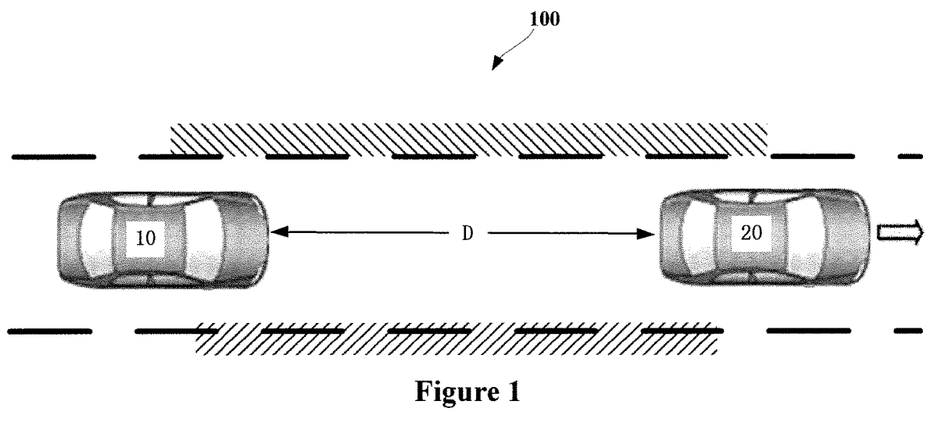
FIG. 1 shows the working scenario for controlling an autonomous vehicle.

FIG. 1 shows the working scenario (100) for controlling an autonomous vehicle (10). As shown in FIG. 1, it is assumed that the target vehicle (10) drives in the direction indicated by the double-headed arrow on the lane, another object (20) exists ahead of the vehicle (10), and D is the distance between the vehicle (10) and another object (20). The vehicle (10) is assembled with a vehicle control system (500) shown in FIG. 5. The following will describe the embodiments of the present disclosure in the case that another object (20) is a moving vehicle, for example. However, those skilled in the art can understand that another object (20) can be any moving or still object ahead of the vehicle (10). In the case that another object (20) is still, the speed of another object is considered zero.

Figure 2:
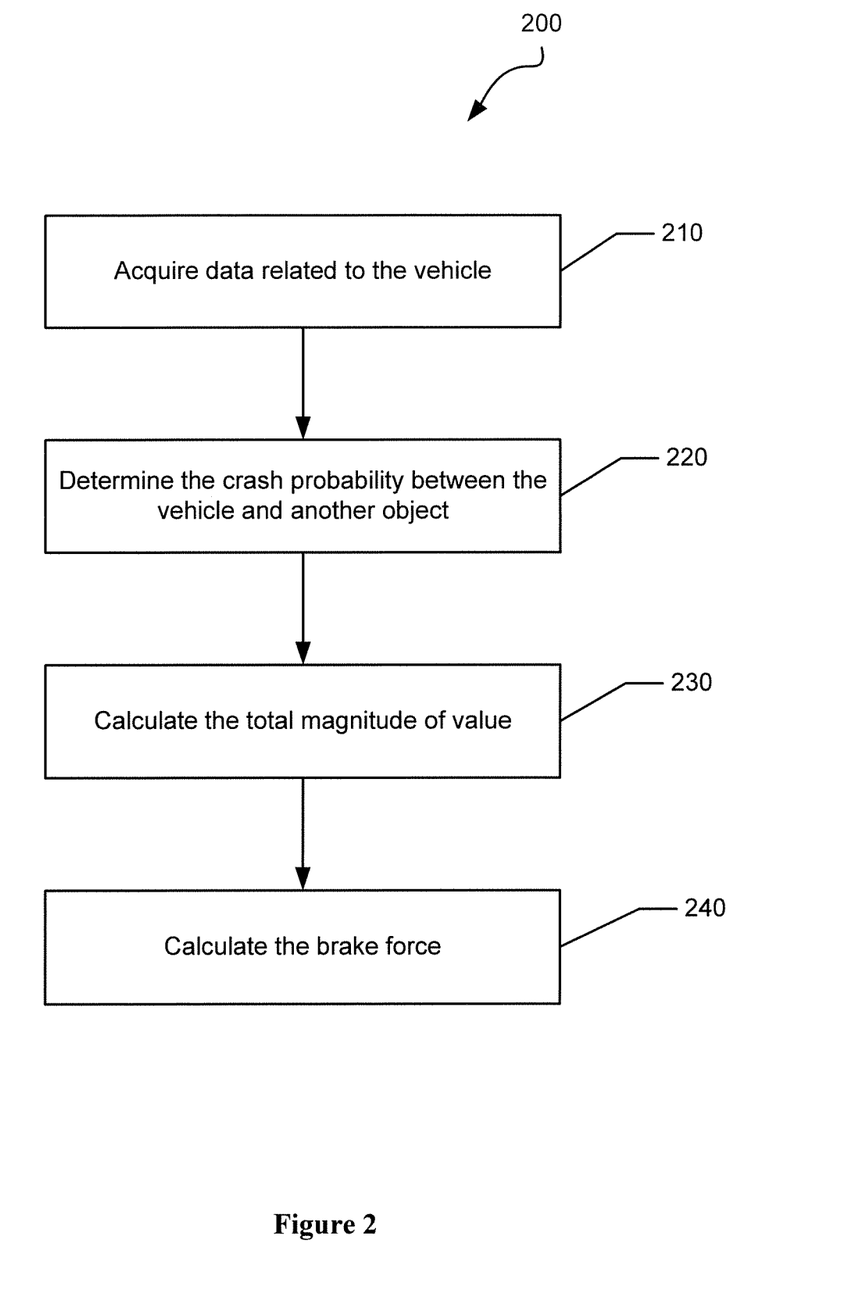
FIG. 2 is a flowchart of the method for controlling an autonomous vehicle in the present disclosure.

FIG. 2 is a flowchart of the method (200) for controlling an autonomous vehicle (10) in the present disclosure.

As shown in FIG. 2, the method (200) starts with step 210, wherein the vehicle (10) utilizes the sensor group (not shown in the figure) to acquire data related to the vehicle (10). The data includes the speed (V1) of the vehicle (10), the speed (V2) of another vehicle (20) ahead of the vehicle (10), and the distance (D) between the vehicle (10) and another vehicle (20).

In one embodiment, the sensor group of the vehicle (10) can include one or more types of a laser distance sensor, a radar sensor, and a body control unit.

Next, in step 220, the vehicle (10) determines the crash probability between the vehicle (10) and another vehicle (20) according to the vehicle (10) related data acquired in step 210.

Figure 3:
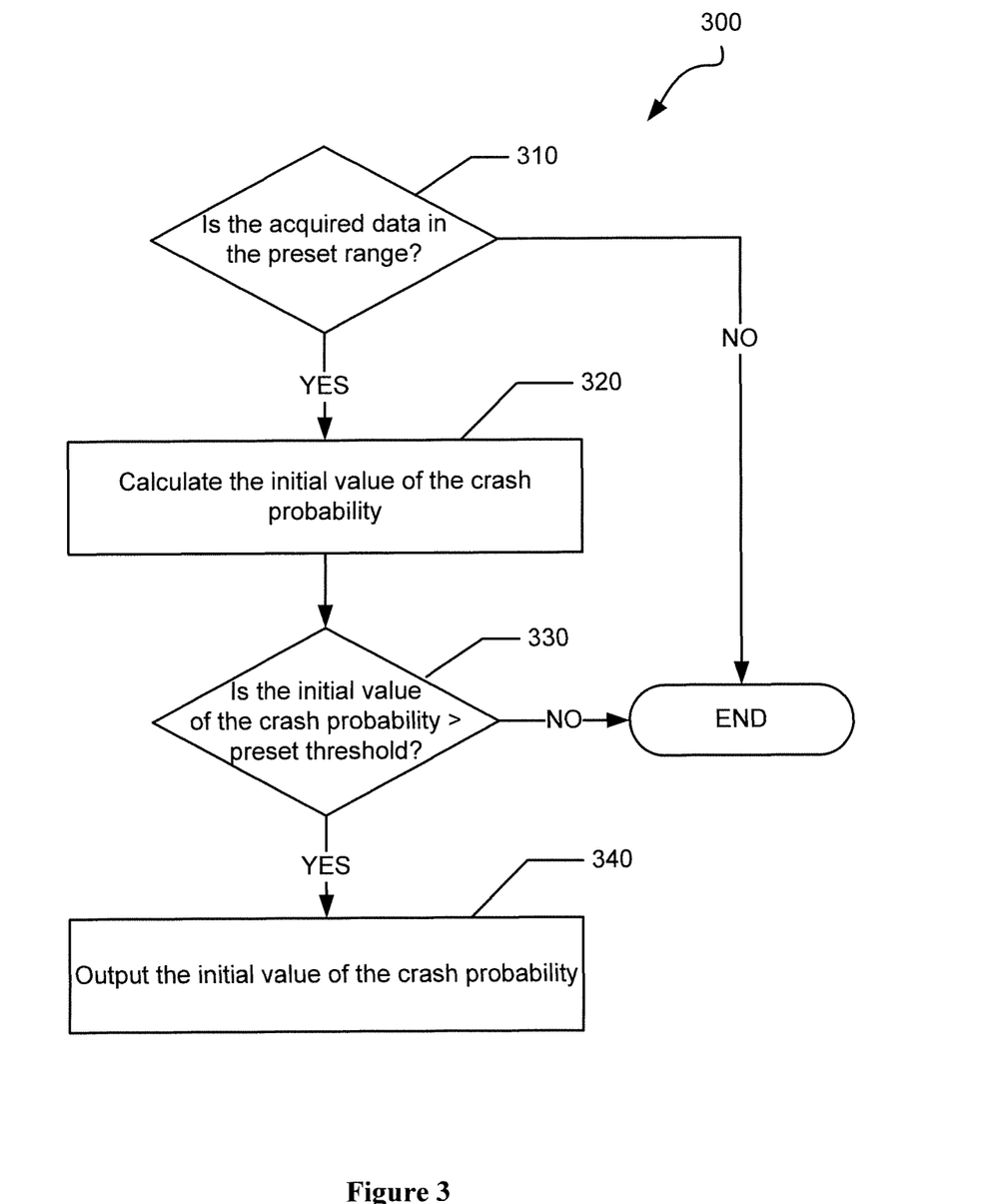
FIG. 3 is a flowchart of the method for determining the initial value of the crash probability in an embodiment of the present invention.

Here, determining the crash probability includes determining the initial value of the crash probability and the updated value of the crash probability (for example, at a certain brake ratio). FIG. 3 is a flowchart (300) of the method for determining the initial value of the crash probability in an embodiment of the present invention.

In step 310, the vehicle (10) determines whether the vehicle (10) related data acquired in step 210 is in the preset range.

For example, determining whether the vehicle (10) related data is in the preset range can include determining whether V1 is greater than V2. If V1 is less than or equal to V2, it is theoretically considered that there is no crash risk between the vehicle (10) and another vehicle (20). In this case, the methods (300 and 200) end.

For example, determining whether the vehicle (10) related data is in the preset range can include determining whether the distance (D) between the vehicle (10) and another vehicle (20) is less than or equal to a certain value (3 km, for example). If the distance (D) is greater than this value, it is considered that the distance between the two vehicles is so large that anti-crash control does not need to be started for the autonomous vehicle. In this case, the methods (300 and 200) also end.

If the data related to the vehicle (10) is in the preset range (the determination result in step 310 is "Yes"), the method (300) goes to step 320 to calculate the initial value of the crash probability.

On the other hand, if at least one in the data related to the vehicle (10) is not in the preset range (the determination result in step 310 is "No"), it indicates that the parameter is abnormal and the method (300) (together with the method (200)) ends. In addition, in such a case, the vehicle (10) can send an alert to the driver, indicating that a detected parameter is abnormal.

In one embodiment, in step 320, the initial value of the crash probability can be calculated according to formula (2), for example.

$$p_0 = e^{-\mu D/(V1-V2)}, \quad (2)$$

wherein, $p_0$ indicates the initial value of the crash probability, D indicates the distance between the vehicle (10) and another vehicle (20), V1 indicates the speed of the vehicle (10), V2 indicates the speed of another vehicle (20), and μ is an empirically coupled parameter based on the prospect theory and is greater than 0 but less than 1.

Here, μ is a parameter which is determined through experiments and is used to set the degree of the bias of crash probability evaluations. A small value of μ determines a strict evaluation tendency for the crash risk, while a large value determines a loose evaluation tendency for the crash risk.

Next, in step 330, the vehicle (10) determines whether the obtained initial value of the crash probability in step 320 is greater than the preset threshold. Here, the preset threshold is also an empirically coupled value. Since it is more difficult for people to withstand the loss brought about by a vehicle crash than the profit brought about by comfort reduction, the preset threshold is set to a very small value. In this way, not only frequent braking operations can be avoided, but also the crash probability is reduced to a value safe enough.

If the initial value of the crash probability is not greater than the preset threshold (the determination result in step 330 is "No"), it indicates that the crash probability is so low that no control intervention is required, and the method (300) (together with the method (200)) ends.

On the other hand, if the initial value of the crash probability is greater than the preset threshold (the determination result in step 330 is "Yes"), the initial value of the crash probability is output for the subsequent step (step 230) of calculating the total magnitude of value.

The determination and elimination of the case that no system intervention control is obviously required by use of the method (300) can avoid passenger comfort reduction caused by frequent braking operations.

Now we go back to FIG. 2. Next, in step 230, the vehicle (10) calculates the total magnitude of value according to the crash probability calculated in step 220 on the basis of the prospect theory. The total magnitude of value indicates the balance between the value of crash risk reduction and the value of user comfort loss. The calculation of the total magnitude of value relates to the updating of the crash probability (that is to say, the crash probability is updated along with the brake ratio) and the calculation of the total magnitude of value in the case of each crash probability.

For example, in one embodiment, the total magnitude of value can be calculated according to formula (3) below:

$$U(g) = w(p(g)) * V_R(g) + V_C(g), \quad (3)$$

wherein U(g) indicates the total magnitude of value at a brake ratio (g), w(*) indicates a weight function, p(g) is the crash probability at a brake ratio (g) and p(g) is greater than 0, $V_R(g)$ is the value of crash risk reduction at a brake ratio (g), and $V_C(g)$ is the value of comfort loss at a brake ratio (g).

Figure 4:
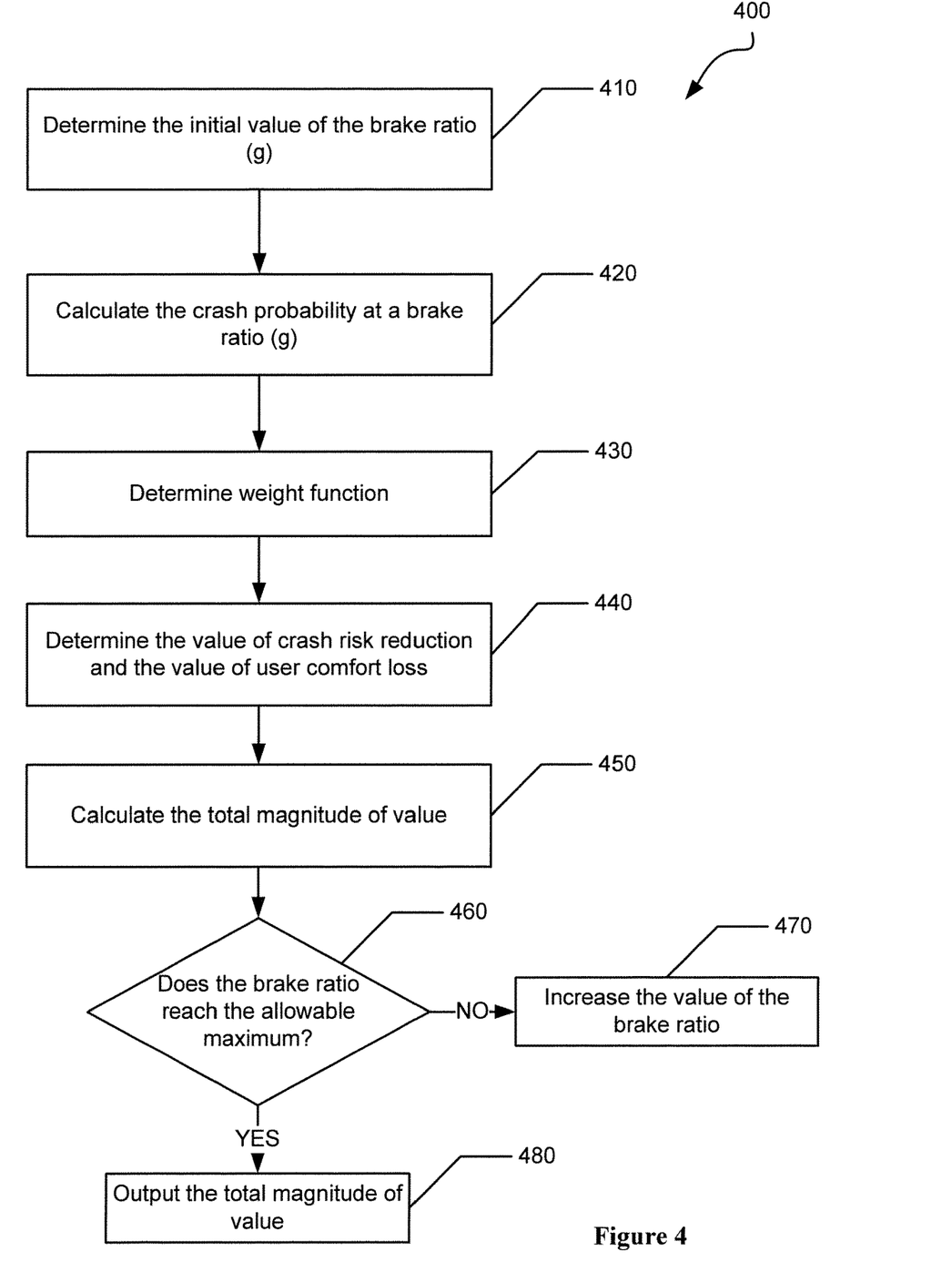
FIG. 4 is a flowchart of the method for calculating the total magnitude of value in an embodiment of the present disclosure.

The following will describe in detail the calculation process of the total magnitude of value in combination with FIG. 4. FIG. 4 is a flowchart of the method (400) for calculating the total magnitude of value in an embodiment of the present disclosure.

In step 410, the initial value of the brake ratio (g) of the vehicle (10) is determined.

In an embodiment, the initial value of the brake ratio is determined according to related standards (for example, ISO2631-1 Comfort Evaluation Standard) in the automobile industry. For example, the initial value of the brake ratio can be determined to be g=0.315 m/s² according to ISO2631-1 Comfort Evaluation Standard. In addition, the initial value, for example, can be stored in the vehicle control system in advance, or can be issued by a higher-level control system to the vehicle (10) as required.

Next, the crash probability (p) at a brake ratio (g) is calculated according to the determined initial value of the brake ratio (g) in step 410.

In one embodiment, the crash probability p(g) at a brake ratio (g) can be calculated, for example, according to formula (4) below:

$$p(g) = e^{-\frac{\mu}{g}\left(V1-V2-\sqrt{(V1-V2)^2-2gD}\right)}, \quad (4)$$

wherein $\mu$ is an empirically coupled parameter based on the prospect theory and is greater than 0 but less than 1, D indicates the distance between the vehicle (10) and another vehicle (20), V1 indicates the speed of the vehicle (10), and V2 indicates the speed of another vehicle (20).

In step 430, the weight function w(*) in the calculation of the total magnitude of value is determined.

In one embodiment, the weight function w(p) at a crash probability (p) can be determined, for example, according to formula (5) below:

$$w(p)=p^\delta/(p^\delta+(1-p^\delta))^{1/\delta}, \quad (5)$$

wherein p is a crash probability, and $\delta$ is an empirically coupled parameter based on the prospect theory.

In a typical embodiment, $\delta$ is 0.65.

In one embodiment, the value of crash risk reduction and the value of user comfort loss at a brake ratio (g) can be determined respectively according to formula (6) and formula (7) below:

$$V_R(g)=g^\alpha, \quad (6)$$

wherein $\alpha$ is an empirically coupled parameter based on the prospect theory and is greater than 0 but less than 1.

In a typical embodiment, $\alpha$ is 0.88.

$$V_C(g)=-\theta g^\beta, \quad (7)$$

wherein $\beta$ is an empirically coupled parameter based on the prospect theory and is greater than 0 but less than 1, and $\theta$ is an empirically coupled parameter based on the prospect theory and is greater than 0.

In a typical embodiment, $\beta$ is 0.88.

Next, in step 450, the vehicle (10) calculates the total magnitude of value according to formula (3).

The method (400) can further comprise step 460, wherein the vehicle (10) determines whether the brake ratio (g) reaches the allowable maximum.

If the brake ratio (g) does not reach the allowable maximum (the determination result in step 460 is "No"), the vehicle increases the value of g in step 470 and goes back to step 420 to repeat steps 420 to 470.

On the other hand, if the brake ratio (g) reaches the allowable maximum (the determination result in step 460 is "Yes"), the calculated total magnitude of value is output in step 480 for the step of calculating the brake force (step 240).

Here, the allowable maximum of the brake ratio (g) depends on the specification design of the vehicle and can be stored in the vehicle control system of the vehicle (10) in advance or issued by a higher-level control system to the vehicle (10).

In one embodiment, step 230 further comprises acquiring the calculation origin according to the reference point preset for the control system of the vehicle (10) and calculating the total magnitude of value according to the crash probability and the calculation origin on the basis of the prospect theory. Here, the preset reference point indicates the case that the vehicle (10) takes no braking measure.

Now we go back to FIG. 2 again. In step 240, the vehicle (10) calculates the brake force according to the output total magnitude of value in step 480.

In one embodiment, the brake force can be determined according to formula (8) below:

$$G=U^{-1}(\max(U(g))), \quad (8)$$

wherein G is the brake force, $U^{-1}$ is an inverse function of the function U, max(*) is a maximizing function, g is the brake ratio and is greater than 0, and U(g) is the total magnitude of value at a brake ratio (g).

The method (200) can further comprise the step of outputting the calculated brake force to the brake system (not shown in the figure) of the vehicle (10) so that the brake system brakes the vehicle (10) (not shown in the figure) according to the brake force.

Figure 5:
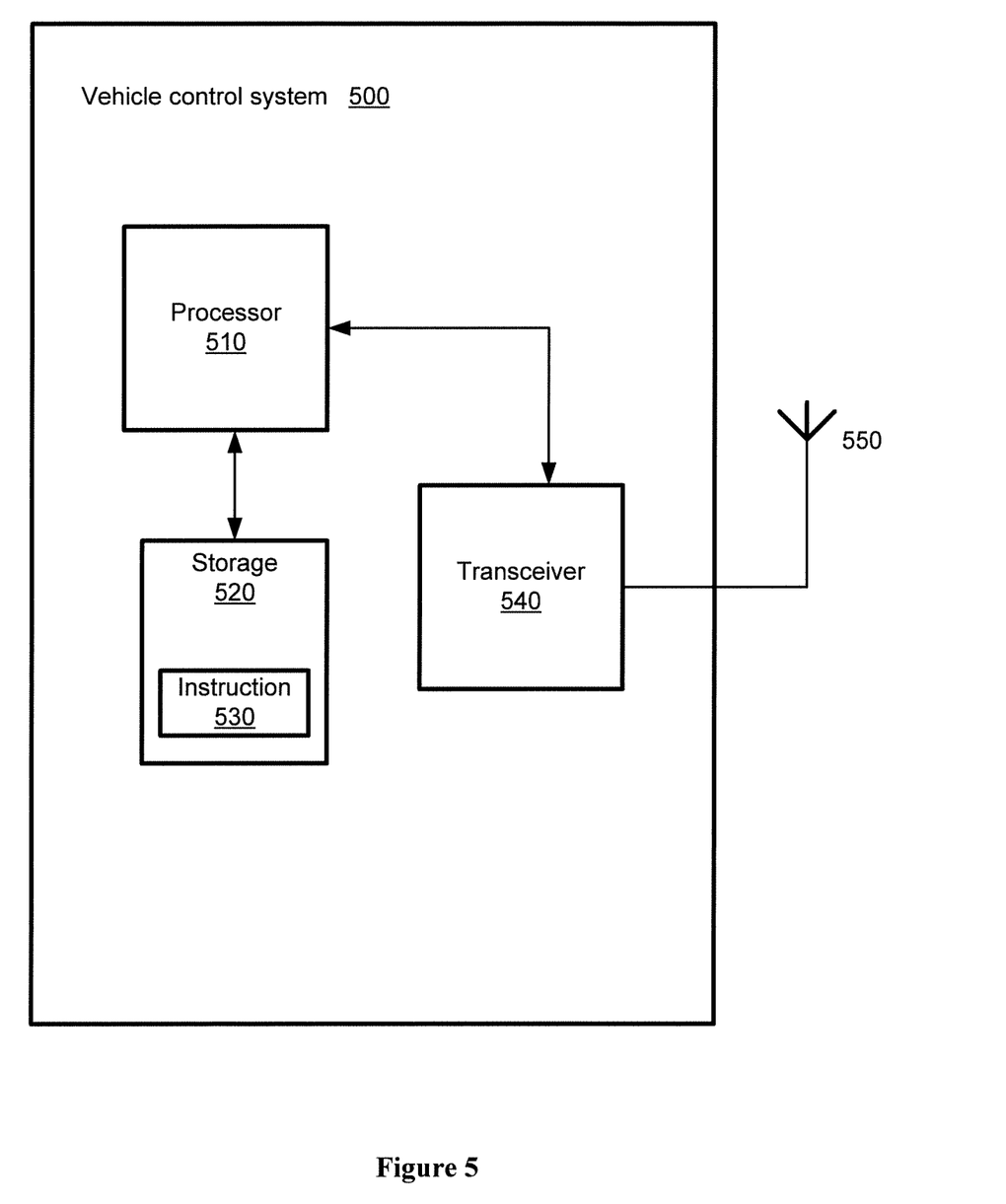
FIG. 5 is a block diagram for the vehicle control system suitable for realizing an embodiment of the present disclosure.

FIG. 5 is a block diagram for the vehicle control system (500) suitable for realizing an embodiment of the present disclosure. The vehicle control system (500) is located in the vehicle (10) so as to realize the solution in the present disclosure.

As shown in FIG. 5, the vehicle control system (500) comprises a processor (510). The processor (510) controls the operations and functions of the vehicle control system (500). For example, in some embodiments, the processor (510) can perform various operations with the aid of the instructions (530) stored in the storage (520) coupled with the processor. The storage (520) can be any proper type of storage which is applicable to the local technological environment and can be realized by use of any proper data storage technology, including but not limited to a semiconductor-based storage device, a magnetic storage device and system, and an optical storage device and system. Although only one storage unit is shown in FIG. 5, there can be a plurality of physically different storage units in the vehicle control system (500).

The processor (510) can be any proper type of processor which is applicable to the local technological environment, and can include but is not limited to one or more of a general-purpose computer, a special-purpose computer, a microprocessor, a digital signal processor (DSP), and a processor based multi-core processor architecture. The vehicle control system (500) can also comprise a plurality of processors (510). The processor (510) is coupled with the transceiver (540), and the transceiver (540) can realize the receiving and sending of information with the aid of one or more antennas (550) and/or other components.

When the vehicle control system (500) is used to execute the solution in the present invention, the processor (510), the transceiver (540), and/or other components can be configured (for example, configured by the instructions (530) stored in the storage (520) to realize the functions of the methods (200 to 400) described in FIG. 2 to FIG. 4. All characteristics described in FIG. 2 to FIG. 4 are applicable to the vehicle control system (500) and will not be described again here.

Those skilled in the art can understand that the described steps of the methods of the present disclosure are not limited to the exemplified sequence in the drawings and can be performed in any other feasible sequence. For example, in the method (400), step 440 can be performed before steps 420 and 430 or can be performed in parallel with steps 420 and 430.

Those skilled in the art should also understand that the exemplified logic blocks, units, and method steps described in combination with the embodiments in the present application can be realized as electronic hardware, or computer software, or even a combination of electronic hardware and computer software. To clearly express the interchangeability between hardware and software, a general description is given to the functions of above-mentioned exemplified components, units, and method steps. Whether the functions are realized by hardware or software depends on the specific applications and the design constraints on the whole system. Those skilled in the art can realize the described functions for each specific application in an alternative way. However, such a realization policy should not be interpreted as departing from the protection scope of the present invention.

The above-mentioned description of the present invention is intended to allow those skilled in the art to realize or use the present invention. Various modifications or variants to the present invention are obvious to those skilled in the art, and in addition, the general principle defined in this document can also apply to other variants without departing from the spirit and protection scope of the present invention. Therefore, the present invention is not limited to the embodiments and designs in this document, and is consistent with the widest scope of the principle and novelty characteristics disclosed in this document.

What is claimed is:

1. A method for controlling an autonomous vehicle, the method being executed on a non-transitory computer readable medium and comprising:
    utilizing a sensor group of said vehicle to acquire data related to said vehicle, wherein said data includes a speed of said vehicle, a speed of another object ahead of said vehicle, and a distance between said vehicle and the other object,
    determining a crash probability between said vehicle and the other object according to the data related to said vehicle,
    calculating a total magnitude of value according to said crash probability based on a prospect theory, wherein said total magnitude of value indicates a balance between a value of crash risk reduction and a value of user comfort loss, and
    calculating a brake force according to said total magnitude of value to prevent crashing of the autonomous vehicle,
    wherein an initial value of said crash probability is calculated according to the following formula:

$$p_0 = e^{-\mu D/(V1-V2)},$$

wherein, $p_0$ indicates the initial value of said crash probability, D indicates the distance between said vehicle and the other object, V1 indicates the speed of said vehicle, V2 indicates the speed of the other object, and $\mu$ is an empirically coupled parameter based on the prospect theory and is greater than 0 but less than 1.

2. The method according to claim 1, wherein calculating the total magnitude of value according to said crash probability on the basis of the prospect theory further comprises:
    comparing said crash probability with a preset crash probability threshold,
    and calculating said total magnitude of value if said crash probability is greater than said preset crash probability threshold.

3. The method according to claim 1, wherein calculating the total magnitude of value according to said crash probability on the basis of the prospect theory comprises:
    acquiring a calculation origin according to a preset reference point, and
    calculating said total magnitude of value according to said crash probability and said calculation origin based on said prospect theory,
    wherein said preset reference point indicates a case that said vehicle takes no braking measure.

4. A method for controlling an autonomous vehicle executed on a non-transitory computer readable medium, the method comprising:
    utilizing a sensor group of said vehicle to acquire data related to said vehicle, wherein said data includes a speed of said vehicle, a speed of another object ahead of said vehicle, and a distance between said vehicle and the other object,
    determining a crash probability between said vehicle and the other object according to the data related to said vehicle,
    calculating a total magnitude of value according to said crash probability based on a prospect theory, wherein said total magnitude of value indicates a balance between a value of crash risk reduction and a value of user comfort loss, and
    calculating a brake force according to said total magnitude of value to prevent crashing of the autonomous vehicle,
    wherein the total magnitude of value is calculated according to the following formula:

$$U(g) = w(p(g)) * V_R(g) + V_C(g),$$

wherein U(g) indicates the total magnitude of value at a brake ratio (g), w(*) indicates a weight function, p(g) is the crash probability at the brake ratio (g) and p(g) is greater than 0, $V_R(g)$ is the value of crash risk reduction at the brake ratio (g), and $V_C(g)$ is the value of comfort loss at the brake ratio (g).

5. The method according to claim 4, wherein the crash probability at said brake ratio (g) is calculated according to the following formula:

$$p(g) = e^{-\frac{\mu}{g}\left(V1-V2-\sqrt{(V1-V2)^2-2gD}\right)},$$

wherein $\mu$ is an empirically coupled parameter based on the prospect theory and is greater than 0 but less than 1, D indicates the distance between said vehicle and the other object, V1 indicates the speed of said vehicle, and V2 indicates the speed of the other object.

6. The method according to claim 4, wherein said weight function is $$w(p)=p^\delta/(p^\delta+(1-p^\delta))^{1/\delta},$$

wherein p is said crash probability, and $\delta$ is an empirically coupled parameter based on the prospect theory.

7. The method according to claim 6, wherein $\delta$ is 0.65.

8. The method according to claim 4, wherein the value of crash risk reduction at said brake ratio (g) is calculated according to the following formula:

$$V_R(g)=g^\alpha,$$

wherein $\alpha$ is an empirically coupled parameter based on the prospect theory and is greater than 0 but less than 1.

9. The method according to claim 8, wherein $\alpha$ is 0.88.

10. The method according to claim 4, wherein the value of comfort loss at said brake ratio (g) is calculated according to the following formula:

$$V_C(g)=-\theta g^\beta,$$

wherein $\beta$ is an empirically coupled parameter based on the prospect theory and is greater than 0 but less than 1, and $\theta$ is an empirically coupled parameter based on the prospect theory and is greater than 0.

11. The method according to claim 10, wherein $\beta$ is 0.88.

12. The method according to claim 1, wherein said brake force is calculated according to the following formula:

$$G=U^{-1}(\max(U(g))),$$

wherein G is said brake force, $U^{-1}$ is an inverse function of a function U, max(*) is a maximizing function, g is the brake ratio and is greater than 0, and U(g) is the total magnitude of value at the brake ratio (g).

13. A vehicle control system for controlling an autonomous vehicle, comprising:
a storage, which stores computer program instructions, and
a processor, which is configured to run the computer program instructions stored in said storage in order to:
utilize a sensor group of said vehicle to acquire data related to said vehicle, wherein said data includes a speed of said vehicle, a speed of another object ahead of said vehicle, and a distance between said vehicle and the other object,
determine a crash probability between said vehicle and the other object according to the data related to said vehicle,
calculate a total magnitude of value according to said crash probability based on a prospect theory, wherein said total magnitude of value indicates a balance between a value of crash risk reduction and a value of user comfort loss, and
calculate a brake force according to said total magnitude of value to prevent crashing of the autonomous vehicle,
wherein an initial value of said crash probability is calculated according to the following formula:

$$p_0=e^{-\mu D/(V1-V2)},$$

wherein, $p_0$ indicates the initial value of said crash probability, D indicates the distance between said vehicle and the other object, V1 indicates the speed of said vehicle, V2 indicates the speed of the other object, and $\mu$ is an empirically coupled parameter based on the prospect theory and is greater than 0 but less than 1.

14. The vehicle control system according to claim 13, wherein said processor is configured to run the computer program instructions stored in said storage in order to
compare said crash probability with a preset crash probability threshold, and
calculate said total magnitude of value if said crash probability is greater than said preset crash probability threshold.

15. The vehicle control system according to claim 13, wherein said processor is configured to run the computer program instructions stored in said storage in order to:
acquire a calculation origin according to a preset reference point, and
calculate said total magnitude of value according to said crash probability and said calculation origin based on said prospect theory,
wherein said preset reference point indicates a case that said vehicle takes no braking measure.

16. The vehicle control system according to claim 13, wherein said brake force is calculated according to the following formula:

$$G=U^{-1}(\max(U(g))),$$

wherein G is said brake force, $U^{-1}$ is an inverse function of a function U, max(*) is a maximizing function, g is the brake ratio and is greater than 0, and U(g) is the total magnitude of value at the brake ratio (g).

17. A vehicle control system for controlling an autonomous vehicle, comprising:
a storage, which stores computer program instructions, and
a processor, which is configured to run the computer program instructions stored in said storage in order to:
utilize a sensor group of said vehicle to acquire data related to said vehicle, wherein said data includes a speed of said vehicle, a speed of another object ahead of said vehicle, and a distance between said vehicle and the other object,
determine a crash probability between said vehicle and the other object according to the data related to said vehicle,
calculate a total magnitude of value according to said crash probability based on a prospect theory, wherein said total magnitude of value indicates a balance between a value of crash risk reduction and a value of user comfort loss, and
calculate a brake force according to said total magnitude of value to prevent crashing of the autonomous vehicle, wherein the total magnitude of value is calculated according to the following formula:

$$U(g)=w(p(g))*V_R(g)+V_C(g),$$

wherein U(g) indicates the total magnitude of value at a brake ratio (g), w(*) indicates a weight function, p(g) is the crash probability at the brake ratio (g) and p(g) is greater than 0, $V_R(g)$ is the value of crash risk reduction at the brake ratio (g), and $V_C(g)$ is the value of comfort loss at the brake ratio (g).

18. The vehicle control system according to claim 17, wherein the crash probability at said brake ratio (g) is calculated according to the following formula:

$$p(g)=e^{-\frac{\mu}{g}\left(V1-V2-\sqrt{(V1-V2)^2-2gD}\right)},$$

wherein μ is an empirically coupled parameter based on the prospect theory and is greater than 0 but less than 1, D indicates the distance between said vehicle and the other object, V1 indicates the speed of said vehicle, and V2 indicates the speed of the other object.

19. The vehicle control system according to claim 17, wherein said weight function is $$w(p)=p^{\delta}/(p^{\delta}+(1-p^{\delta}))^{1/\delta},$$

wherein p is said crash probability, and δ is an empirically coupled parameter based on the prospect theory.

20. The vehicle control system according to claim 19, wherein δ is 0.65.

21. The vehicle control system according to claim 17, wherein the value of crash risk reduction at said brake ratio (g) is calculated according to the following formula:

$$V_R(g)=g^{\alpha},$$

wherein α is an empirically coupled parameter based on the prospect theory and is greater than 0 but less than 1.

22. The vehicle control system according to claim 21, wherein α is 0.88.

23. The vehicle control system according to claim 17, wherein the value of said user comfort loss at said brake ratio (g) is calculated according to the following formula:

$$V_C(g)=-\theta g^{\beta},$$

wherein β is an empirically coupled parameter based on the prospect theory and is greater than 0 but less than 1, and θ is an empirically coupled parameter based on the prospect theory and is greater than 0.

24. The vehicle control system according to claim 23, wherein β is 0.88.

* * * * *